United States Patent [19]

Custer

[11] Patent Number: 5,004,081

[45] Date of Patent: Apr. 2, 1991

[54] BATTERY RESTRAINT SYSTEM

[75] Inventor: Bruce C. Custer, Metamora, Ill.

[73] Assignee: Caterpillar Inc., Peoria, Ill.

[21] Appl. No.: 453,747

[22] Filed: Dec. 20, 1989

[51] Int. Cl.5 ............................................ B60R 16/04
[52] U.S. Cl. ................................................ 180/68.5
[58] Field of Search ............ 180/68.5; 248/503, 309.1; 206/335

[56] References Cited

U.S. PATENT DOCUMENTS

| | | | |
|---|---|---|---|
| 929,118 | 7/1909 | Buckwalter | 180/68.5 |
| 1,392,757 | 10/1921 | Gates | 180/68.5 |
| 1,459,973 | 6/1972 | Colgan | 180/68.5 |
| 1,734,645 | 11/1929 | Polland | 180/68.5 |
| 2,257,155 | 9/1941 | Bowers | 180/68.5 |
| 2,551,990 | 5/1951 | Wills | 180/68.5 |
| 3,866,704 | 2/1975 | Bowers et al. | 180/68.5 |
| 4,033,424 | 7/1977 | Evans | 180/68.5 |
| 4,252,206 | 2/1981 | Burkholder et al. | 180/68.5 |
| 4,682,751 | 7/1987 | Tamas | 248/503 |
| 4,936,409 | 6/1990 | Nix et al. | 180/68.5 |

Primary Examiner—Andres Kashnikow
Assistant Examiner—Richard Camby
Attorney, Agent, or Firm—Claude F. White

[57] ABSTRACT

A battery restraint system for an earthmoving vehicle includes a pair of non-metallic straps with one end of each strap securely fastened to the vehicle frame structure by a bracket. The other end of each strap has a loop which accepts one end of a tensioning bar. A threaded fastener and compression spring connect the center portion of the tensioning bar to the vehicle frame structure and apply a constant and consistent force on the tensioning bar and on the straps. Conventional battery restraints use a metal bracket clamped to the battery by several threaded fasteners. During vehicle operation, the threaded fasteners become loose which allows the battery to move. The fasteners are often difficult to gain access to for re-tightening. The subject battery restraint system maintains a constant force on the battery, and the single threaded fastener is easily accessed.

13 Claims, 3 Drawing Sheets

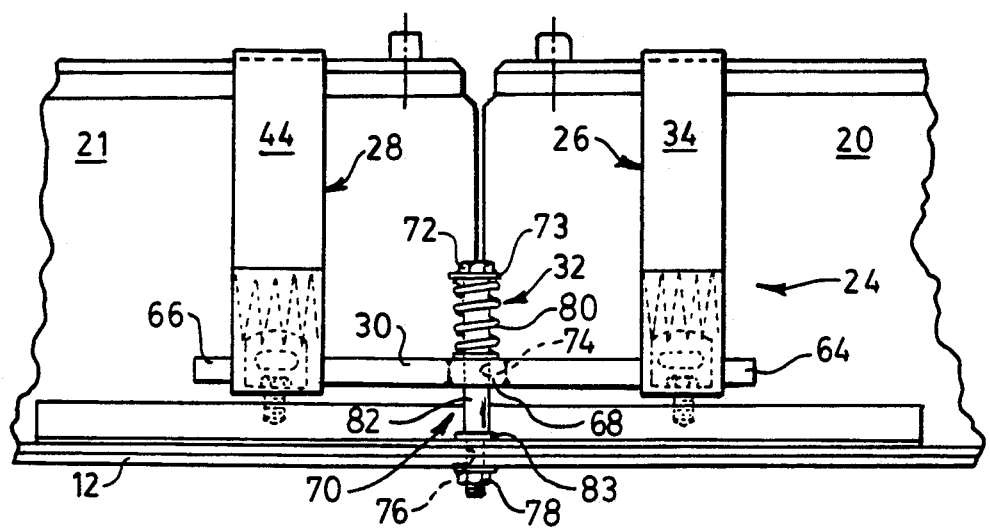
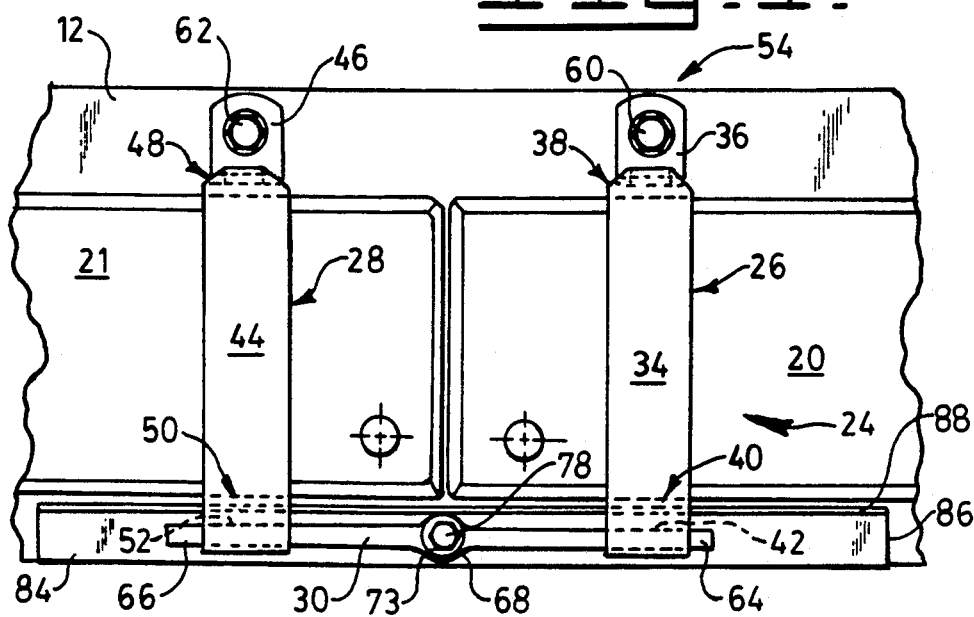

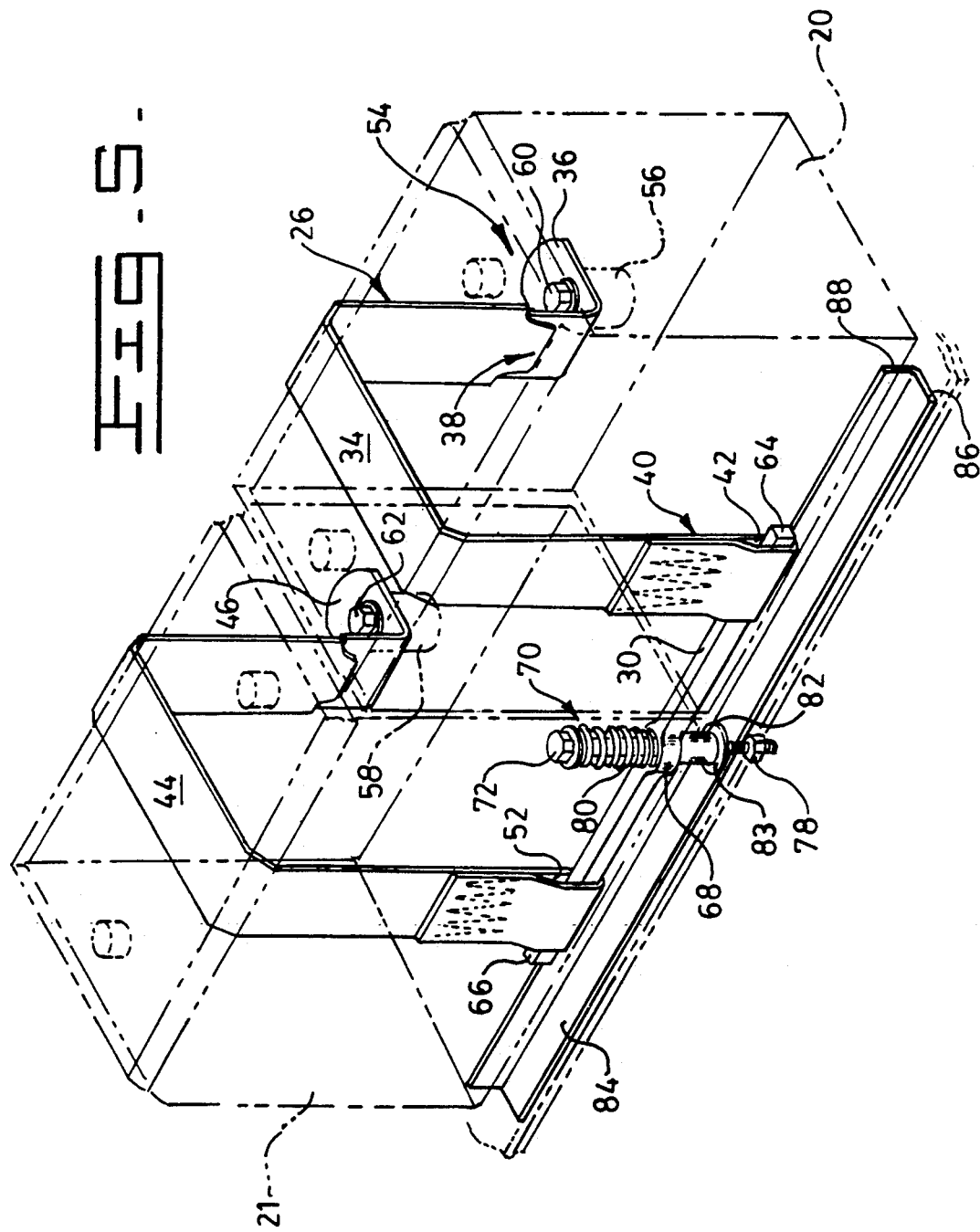

BATTERY RESTRAINT SYSTEM

DESCRIPTION

1. Technical Field

This invention relates generally to a restraint system for a vehicle battery and more particularly to such a restraint system which includes apparatus and method for applying a constant restraining force on the battery.

2. Background Art

Earthmoving and construction type vehicles, which have internal combustion engines to provide motive power, utilize one or more batteries to provide electrical energy for starting the engines. These batteries are generally positioned in an enclosed compartment and are restrained against movement by various devices, including holddown brackets and adjustable bolts. Many of the battery compartments are small and not easily accessible, since other components of the vehicles utilizes most of the available space.

Because earthmoving vehicles operate in rough environments, which produce shock loads on the vehicles, it is extremely important that the battery be secured against movement in any direction. Repeated shock loading of the vehicle causes threaded fasteners on the battery holddown brackets to loosen. Because the batteries are not easily accessible, the unsecured condition of the battery is often undetected until damage to the battery or adjacent vehicle components occurs.

One type of bolted battery holddown is shown in U. S. Pat. No. 3,866,704, issued Feb. 18, 1975, to B. P. Bowers et al. In this patent, the battery is supported in a frame and is held down by holder brackets and threaded bolts which interconnect the frame and the holder brackets. Another type of battery holddown is shown in U.S. Pat. No. 2,257,155, issued Sept. 30, 1941, to C. E. Bowers. In this patent, an adjustable metal bracket is clamped over the top of the battery and secured by a pair of threaded rods or clamping bolts.

In each of the above noted battery holddown devices, the battery is secured by a metal bracket and a pair of threaded bolts. In service, the bolts would need to be tightened periodically to maintain the clamping force. In a small, rather inaccessible compartment, continued checking of the bolts would be difficult. Since batteries emit corrosive fumes, corrosion and deterioration of the brackets and bolts is also a problem.

The present invention is directed to overcoming one or more of the problems as set forth above.

DISCLOSURE OF THE INVENTION

In one aspect of the present invention, a battery restraint system for securing a battery to a frame structure has first and second strap assemblies with each assembly including a strap having first and second end portions, a bracket secured to each first portion, and each second end portion having a loop. The battery restraint system further includes a tensioning bar having first and second end portions and a center portion with the first and second end portions engaging the respective loops in the first and second straps. A first means secures the brackets to the frame structure and a second means secures the center portion of the tensioning bar to the frame structure.

The batteries on earthmoving vehicles are generally enclosed in a small rather inaccessible compartment and are secured against movement by a bracket on top of the battery and a plurality of threaded bolts or rods which extend through the bracket and into the vehicle framework. Constant shock loads and vibration loosens the threaded bolts and allows the battery to shift, causing damage to the battery and other vehicle components. Since the battery is not easily accessible, and the holddown bolts are often difficult to gain access to, the loose condition of the battery persists until damage occurs. Corrosion of the metal holddown brackets and bolts is also a problem.

The subject invention provides non-metallic, corrosive resistant, straps and a tensioning system for securing one or more batteries to a vehicle frame. The tensioning system applies a consistent and constant force on the straps, and therefore on the batteries, to hold the batteries in a non-moveable position. Once the batteries are in place, it is necessary to gain access to only one side of the batteries to secure the tensioning system.

BRIEF DESCRIPTION OF THE DRAWINGS

FIG. 3 is a diagrammatic rear elevational view taken generally along lines 3—3 of FIG. 2;

FIG. 4 is a diagrammatic plan view taken generally along liens 4—4 of FIG. 2; and FIG. 5 is a diagrammatic perspective view of the subject invention with the batteries shown in phantom detail.

BEST MODE FOR CARRYING OUT THE INVENTION

Figure 1:
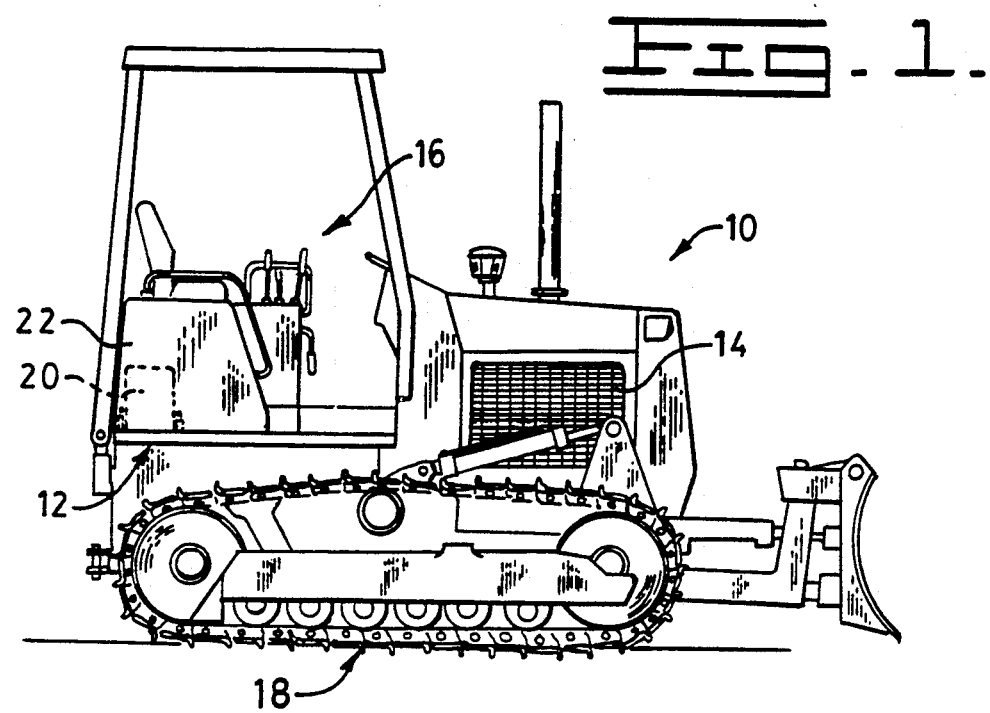
FIG. 1 is a diagrammatic side elevational view of a vehicle incorporating the subject invention.
Figure 2:
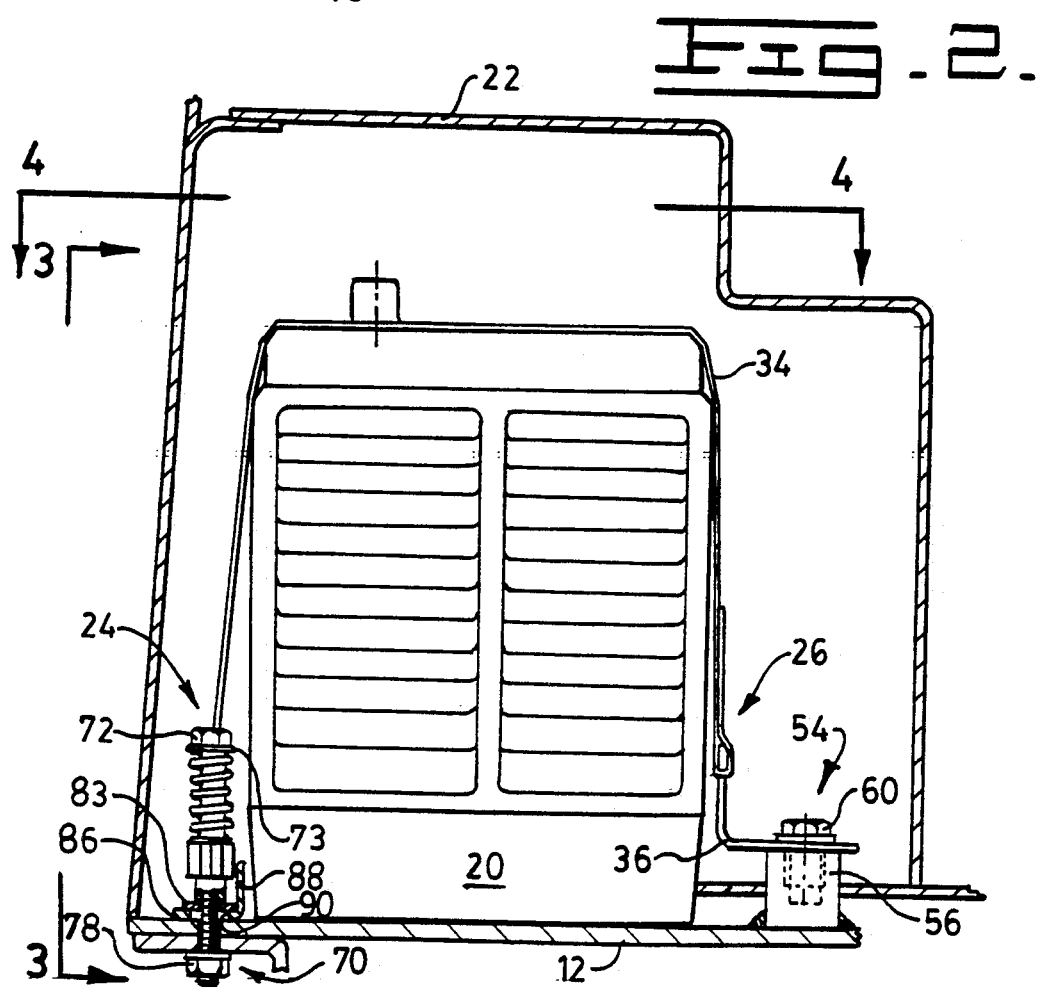
FIG. 2 is a diagrammatic side elevational view, on an enlarged scale, of the subject invention with portions of the surrounding compartment in section.

Referring to the drawings, a earthmoving track-type vehicle 10 has a frame structure 12, an engine 14, an operator's station 16, and an endless track assembly 18 on each side of the vehicle 10. Electrical power for starting the engine 14 and powering other electrical components of the vehicle 10 is provided by first and second batteries 20,21 which are positioned within a closed compartment 22 within the operator's station 16.

The batteries 20,21 are secured to the frame structure 12, and are prevented from movement, by a restraint system 24. The restraint system 24 includes first and second spaced apart strap assemblies 26,28, a tensioning bar 30, and tensioning means 32 for applying a substantially constant force on the tensioning bar 30. The first strap assembly 26 includes a first strap 34 and a first L-shaped bracket 36. The first strap 34 has first and second end portions 38,40 with the first bracket 36 secured to the first end portion 38 and the second end portion 40 defining a closed loop 42. The second strap assembly 28 is substantially similar to the first strap assembly 26 and includes a second strap 44 and a second L-shaped bracket 46. The second strap 44 has first and second end portions 48,50 with the second bracket 46 secured to the first end portion 48 and the second end portion 50 defining a closed loop 52. The first and second brackets 36,46 are fastened to the frame structure by a first securing means 54, which in the preferred embodiment includes first and second threaded bosses 56,58 and first and second threaded fasteners 60,62. The bosses 56,58 are preferably welded to the frame structure 12.

The tensioning bar 30 has first and second end portions 64,66 and an enlarged center portion 68. The first and second end portions 64,66 are adapted to engage the respective loops 42,52 of the first and second straps 34,44. The center portion 68 of the tensioning bar 30 is fastened to the frame structure 12 by a second securing means 70, which in the preferred embodiment includes a threaded fastener 72, a through hole 74 defined by the center portion 68, a mating aligned opening 76 defined by the frame structure 12, and a nut 78 adapted to engage the threaded fastener 72. The threaded fastener 72 includes a washer or an enlarged head portion 73, and is adapted to penetrate the hole 74 and the opening 76 and be secured by the nut 78.

The tensioning means 32, which is capable of applying a substantially constant force to the tensioning bar 30, includes a coil compression spring 80 and a cylindrical sleeve 82. The spring 80 is positioned about the sleeve 82, and the threaded fastener 72 penetrates the sleeve 82 and the spring 80 and compresses the spring 80 as the nut 78 is tightened onto the fastener 72. The spring 80 is compressed between the enlarged head portion 73 of the fastener 72 and the center portion 68 of the tensioning bar 30. A spacer 83 is positioned at the bottom of the sleeve 82.

The batteries 20,21 are constrained against rearward movement by an elongated L-shaped angle member 84. The angle member 84 has a first leg portion 86 in contact with and secured to the frame structure 12, and a second leg portion 88 adjacent the batteries 20,21. The first leg portion 86 has an elongated hole 90, and the threaded fastener 72 passes through the hole 90 and the opening 76 in the frame structure 12 to secure the restraint system 24 and the angle member 84 to the frame 12. The elongated hole 90 allows the angle member 84 to slide against the batteries 20,21 prior to tightening the nut 78 onto the threaded fastener 72. The spacer 83 is positioned between the sleeve 82 and the angle member 84 and spans the elongated hole 90, thus providing good contact area for the sleeve 82. One or more spacers 83 can be used to vary the adjustment of the tension provided by the compression spring 80.

In the preferred embodiment, the first and second straps 34,44 are formed of polypropylene, or other non-metallic material which is resistant to corrosion by the battery fumes. As is evident from the drawings, the first strap 34 is in contact with the first battery 20 and the second strap 44 is in contact with the second battery 21.

INDUSTRIAL APPLICABILITY

With reference to the drawings, the subject battery restraint system 24 is particularly useful for restraining batteries on earthmoving and construction type vehicles. These vehicles often operate in extremely rough environments, which generate shock loads on the vehicle and components. The subject restraint system is intended to prevent such shock load from loosening or dislodging the vehicle batteries 20,21 from their restrained position.

To install the batteries 20,21 and the restraint system 24, an access panel (not shown) is removed from the closed compartment 22, which exposes the battery storage area. The first and second brackets 36,46 of the strap assemblies 34,44 are then secured to the frame structure 12 by the threaded fasteners 60,62. The straps 34,44 are then held to one side while the batteries 20,21 are placed in position on the frame structure 12. At this time, the straps 34,44 are looped over the batteries 20,21 and the first and second end portions 64,66 of the tensioning bar 30 are placed in the loops 42,52. The sleeve 82 is now placed within the hole 74 in the tensioning bar center portion 68, the spring 80 is placed over the sleeve 82, and the threaded fastener 72 is inserted through the sleeve 82, the spacer 83, and the hole 76 in the frame structure 12. The nut 78 is now threaded onto the fastener 72, which compresses the spring 80 and forces the tensioning bar 30 downwardly toward the frame structure 12. Movement of the tensioning bar 30 tightens the straps 34,44 onto the batteries 20,21 and holds the batteries 20,21 tightly against the frame structure 12. The spring action of the tensioning bar 30 maintains a constant and consistent force on the straps 34,44.

During operation of the vehicle 10, shock loads which would normally cause the batteries to raise up off the frame structure 12 are resisted by the action of the compressed spring 80. If the batteries should need to be removed, the tensioning means 32, including the tensioning bar 30, can be removed by removing the nut 78 from the fastener 72. The straps 34,44 can then be lifted out of the way and the batteries 20,21 removed.

Other aspects, objects, and advantages of this invention can be obtained from a study of the drawings, the disclosure, and the appended claims.

I claim:

1. A battery restraint system for securing a battery to a frame structure, comprising:
   first and second spaced apart strap assemblies, each including a flexible non-metallic strap having a first end portion and a second end portion, a bracket secured to each of said first end portions, and said second end portion defining a loop;
   a tensioning bar having first and second end portions and a center portion, said first and second end portions being adapted to engage respectively said first and second loops;
   first means for securing said brackets to said frame structure;
   second means for securing said center portion of said tensioning bar to said frame structure; and
   tensioning means for applying a substantially constant downward force on said tensioning bar and said first and second strap assemblies.

2. The battery restraint system, as set forth in claim 1, wherein said tensioning means includes a coil spring.

3. The battery restraint system, as set forth in claim 1, wherein said second securing means includes a threaded fastener, a through hole defined by said center portion of said tensioning bar, and a mating aligned opening defined by said frame structure, said threaded fastener adapted to penetrate said through hole and said opening.

4. The battery restraint system, as set forth in claim 3, wherein said tensioning means includes a coil spring, said threaded fastener includes an enlarged head portion, said coil spring being compressible between said head portion and said tensioning bar center portion.

5. The battery restraint system, as set forth in claim 1 wherein said second securing means includes a threaded fastener having an enlarged head portion, and said tensioning means includes a compression spring, said spring being compressible between said enlarged head portion and said center portion of said tensioning bar.

6. The battery restraint system, as set forth in claim 1, wherein said straps are formed of polypropylene.

7. The battery restraint system, as set forth in claim 1, including an angle member having a first leg portion in contact with said frame structure and a second leg portion adjacent said battery.

8. The battery restraint system, as set forth in claim 1, wherein said tensioning means includes a coil spring, a cylindrical sleeve, and a threaded fastener having an enlarged head portion, said spring being positioned about said sleeve, and said threaded fastener being adapted to penetrate said sleeve and compress said spring between said head portion and said tensioning bar center portion.

9. A restraint system for restraining and securing first and second batteries to a vehicle frame structure, said restraint system comprising:

first and second strap assemblies, each assembly including a polypropylene strap and an L-shaped bracket, each strap having first and second end portions, said second end portion defining a closed loop and said first end portion being secured to said bracket;

first threaded fastening means for releasably securing each of said brackets to said frame structure;

an elongated tensioning bar having first and second end portions and an enlarged center portion, said center portion defining a through hole, said first and second end portions being adapted to engage respectively said loops in said first and second straps; and means for applying a substantially constant force to said tensioning bar, said means including a cylindrical sleeve, a coil spring positioned about said sleeve, and second threaded fastening means for securing said sleeve, said spring, and said tensioning bar to said frame structure.

10. The restraint system, as set forth in claim 9, wherein said first strap is in contact with said first battery and said second strap is in contact with said second battery.

11. The restraint system, as set forth in claim 9, including an elongated L-shaped angle member having a first leg portion in contact with said frame structure and a second leg portion adjacent said batteries.

12. The restraint system, as set forth in claim 11, including a spacer positioned between said sleeve and said L-shaped angle member.

13. A battery restraint system for securing a battery to a frame structure, comprising:

first and second spaced apart strap assemblies, each including a strap having a first end portion and a second end portion, a bracket secured to each of said first end portions, and said second end portion defining a loop;

a tensioning bar having first and second end portions and a center portion, said first and second end portions being adapted to engage respectively said first and second loops;

first means for securing said brackets to said frame structure;

second means for securing said center portion of said tensioning bar to said frame structure; and tensioning means for applying a substantially constant force on said tensioning bar, said tensioning means including a coil spring, a cylindrical sleeve, and a threaded fastener having an enlarged head portion, said spring being positioned about said sleeve, and said threaded fastener being adapted to penetrate said sleeve and compress said spring between said head portion and said tensioning bar center portion.

* * * * *